(12) United States Patent
Bhatia et al.

(10) Patent No.: US 7,483,458 B2
(45) Date of Patent: Jan. 27, 2009

(54) WAVELENGTH CONTROL IN SEMICONDUCTOR LASERS

(75) Inventors: Vikram Bhatia, Painted Post, NY (US); Jacques Gollier, Painted Post, NY (US); Martin H. Hu, Painted Post, NY (US); David A. Loeber, Horseheads, NY (US); Daniel Ohen Ricketts, Corning, NY (US); Chung-En Zah, Holmdel, NY (US)

(73) Assignee: Corning Incorporated, Corning, NY (US)

( * ) Notice: Subject to any disclaimer, the term of this patent is extended or adjusted under 35 U.S.C. 154(b) by 23 days.

(21) Appl. No.: 11/549,856

(22) Filed: Oct. 16, 2006

(65) Prior Publication Data

US 2008/0089373 A1    Apr. 17, 2008

(51) Int. Cl.
*H01S 3/00* (2006.01)
(52) U.S. Cl. ............ 372/38.02; 372/38.07; 372/29.015
(58) Field of Classification Search .............. 372/38.02, 372/38.07, 29.015
See application file for complete search history.

(56) References Cited

U.S. PATENT DOCUMENTS

| | | | |
|---|---|---|---|
| 4,799,069 A | 1/1989 | Sasaki et al. ................ 346/108 |
| 5,077,748 A | 12/1991 | Koslovsky et al. ............ 372/22 |
| 5,220,578 A | 6/1993 | Koch et al. | |
| 5,386,124 A * | 1/1995 | Yasuda et al. ................ 250/585 |
| 6,816,525 B2 | 11/2004 | Stintz et al. | |

| | | | |
|---|---|---|---|
| 2003/0210716 A1 | 11/2003 | Sakata et al. ................... 372/22 |

FOREIGN PATENT DOCUMENTS

EP       0625842        5/1994

OTHER PUBLICATIONS

Minoru Yamada et al., Analysis of gain suppression in undoped injections lasers, 1981 American Institute of Physics, pp. 2653-2664, Apr. 1981, vol. 52 No. 4, USA.
Santa Chawla, Frequency stablization of diode lasers, National Physical Laboratory, New Delhi, India, no date provided.
Moustafa F. Ahmed et al., Influence of the Spectral Gain Suppression on the Intensities of Longitudinal Modes n 1.55 um InGaAsP Lasers, pp. 205-223, Egypt, vol. 26 No. 2, 2003.

(Continued)

*Primary Examiner*—Dung T Nguyen
(74) *Attorney, Agent, or Firm*—Kwodjo Aduser Poku; Gregory V. Bean; Dinsmore & Shohl, LLP (57) ABSTRACT

The present invention relates generally to semiconductor lasers and laser scanning systems and, more particularly, to schemes for controlling wavelength in semiconductor lasers. According to one embodiment of the present invention, a method of minimizing laser wavelength variations in a semiconductor laser is provided. According to the method, one or more of the laser drive currents is configured to comprise a drive portion and a wavelength recovery portion. The wavelength recovery portion of the drive current comprises a recovery amplitude $I_R$ that is distinct from the drive amplitude $I_D$ and a recovery duration $t_R$ that is less than the drive duration $t_D$. The recovery amplitude $I_R$ and duration $t_R$ are sufficient to recover carrier density distribution distorted by gain compression effects prior to recovery. Additional embodiments are disclosed and claimed.

30 Claims, 4 Drawing Sheets

OTHER PUBLICATIONS

M. Nakamura et al., Longitudinal-mode behaviors of mode-stabilized AlxGa1-xAs Injection lasers, American Inst. of Physics, Sep. 1978, pp. 4644-4648, vol. 49 No. 9, USA.

N. Ogasawara et al., Longitudinal Mode Competition and Asymmetric Gain Saturation in Semiconductor Injection Lasers, Japanese Journal of Applied Physics, Apr. 1988, vol. 27 No. 4.

T.A. Heumier et al., Mode Hopping in Semiconductor Lasers, Dept of Physics, Montana State University, pp. 1-9, USA, no date provided.

Hirokazu Hori et al., Mode-transition characteristics and tunability of an AlGaAs laser, Am Instit of Physics, Oct. 1986, pp. 2231-2237, vol. 60 No. 7, USA.

Daniel Chu et al., Optional Networks promote tunable laser development, LaserFocusWorld, Aug. 2001.

J.S. Major et al., Singlemode InGaAs/GaAs distributed Bragg reflector laser diodes operating at 1083 nm, Electronics Letters, Nov. 25, 1993, pp. 2121-2122, vol. 29 No. 224, USA.

P. Eliseev et al., Tunable Grating-Coupled Laser Oscillation and Spectral Hole Burning in an InAs Quantum-Dot Laser Diode, IEEE Journal, 2000, pp. 479-485, vol. 36, No. 4, USA.

"Miniatureized Blue Laser using Second Harmonic Generation" Kitoaka, et al Jpn. J. Appl. Phsys. vol. 39 (2000) pp. 3416-3418.

Singlemode InGaAs/GaAs distributed Bragg reflector laser diodes operating at 1083 nm; Electronic Letters Nov. 25, 1993 vol. 29 No. 24 p. 2121.

Laser FocusWorld "Optical networks promote tunable laser development" by Daniel Chu et al Aug. 2001.

Tunable Grating-Coupled Laser Oscillation and Spectral Hole Burning in InAs Quantum—Dot Laser Diode IEEE Journal of Quantum Electronics vol. 36, No. 4 Apr. 2000.

Longitudinal Mode Competition and Asymmetric Gain Saturation in Semiconductor Injection Lasers, I. Experiment, Japanese Journal of Applied Physics vol. 27, No. 4 Apr. 1998, pp. 607-614 by Ogasawara and Ito.

Analysis of gain suppression in undoped injection lasers by Minoru Yamada Japanese Allied Physics 52(4) Apr. 1981 p. 2653.

Influence of the Spectral Gain Suppression on the Intensities of Longitudinal Modes in 1.55 um InGaAsP Lasers M. Ahmed, Egypt, J. Sol, vol. 26, No. 2, 2003 p. 205.

Mode Transition characteristics and tenability of an AlGaAs laser H. Endo, Japanese Applied Physics 60(7), Oct. 1, 1986 p. 2231.

Longitudinal mode behaviors of mode-stabilized A1xGA1-xAs injection lasers M. Nakamura et al Japanese Applied Physics 49(9) Sep. 1978 p. 4644.

Frequency Stabilization of diode lasers Santa Chawla, National Physical Laboratory, Dr. K.S. Krishnan Road, New Dehli, India www.iisc.ernet.in/currsci/jan25/articles_41.htm, no date.

Mode Hopping in Semiconductor Lasers By T.A. Heumier and J.L. Carlsten Department of Physics Montana State University Bozeman MT 59717, no date provided.

* cited by examiner

WAVELENGTH CONTROL IN SEMICONDUCTOR LASERS

CROSS REFERENCE TO RELATED APPLICATIONS

The present application is related to and commonly assigned U.S. patent application Ser. No. 11/998,684 filed Nov. 30, 2007 and Ser. No. 11/900,761 filed Sep. 13, 2007 now U.S. Pat. No. 7,420,997, but does not claim priority thereto.

BACKGROUND OF THE INVENTION

The present invention relates generally to semiconductor lasers and, more particularly, to schemes for minimizing laser wavelength variations by controlling the photon density in the laser cavity of the semiconductor laser. The present invention also relates to laser controllers and laser projection systems incorporating wavelength control schemes according to the present invention.

SUMMARY OF THE INVENTION

The present invention relates generally to semiconductor lasers, which may be configured in a variety of ways. For example and by way of illustration, not limitation, short wavelength sources can be configured for high-speed modulation by combining a single-wavelength semiconductor laser, such as a distributed feedback (DFB) laser, a distributed Bragg reflector (DBR) laser, or a Fabry-Perot laser with a light wavelength conversion device, such as a second harmonic generation (SHG) crystal. The SHG crystal can be configured to generate higher harmonic waves of the fundamental laser signal by tuning, for example, a 1060 nm DBR or DFB laser to the spectral center of a SHG crystal, which converts the wavelength to 530 nm. However, the wavelength conversion efficiency of an SHG crystal, such as MgO-doped periodically poled lithium niobate (PPLN), is strongly dependent on the wavelength matching between the laser diode and the SHG device. As will be appreciated by those familiar with laser design DFB lasers are resonant-cavity lasers using grids or similar structures etched into the semiconductor material as a reflective medium. DBR lasers are lasers in which the etched grating is physically separated from the electronic pumping area of the semiconductor laser. SHG crystals use second harmonic generation properties of non-linear crystals to frequency double laser radiation.

The bandwidth of a PPLN SHG device is often very small—for a typical PPLN SHG wavelength conversion device, the full width half maximum (FWHM) wavelength conversion bandwidth is only in the 0.16 to 0.2 nm range and mostly depends on the length of the crystal. Mode hopping and uncontrolled large wavelength variations within the laser cavity can cause the output wavelength of a semiconductor laser to move outside of this allowable bandwidth during operation. Once the semiconductor laser wavelength deviates outside the wavelength conversion bandwidth of the PPLN SHG device, the output power of the conversion device at the target wavelength drops drastically. In laser projection systems, in particular, mode hops are particularly problematic because they can generate instantaneous changes in power that will be readily visible as defects in specific locations in the image.

Given the challenges associated with wavelength matching and stabilization in developing semiconductor laser sources, the present inventors have recognized potentially beneficial schemes for controlling photon density in the laser cavity.

For example, the present inventors have recognized that although the concepts of the present invention are described primarily in the context of DBR lasers, it is contemplated that the control schemes discussed herein will also have utility in a variety of types of semiconductor lasers, including but not limited to DFB lasers, Fabry-Perot lasers, and many types of external cavity lasers. It is also noted that, the present invention relates to wavelength stabilization in laser sources in general, without regard to whether second harmonic generation is utilized in the laser source.

According to one embodiment of the present invention, a method of minimizing laser wavelength variations in a semiconductor laser is provided. According to the method, one or more of the laser drive currents is configured to comprise a drive portion and a wavelength recovery portion. The wavelength recovery portion of the drive current comprises a recovery amplitude $I_R$ that is distinct from the drive amplitude $I_D$ and a recovery duration $t_R$ that is less than the drive duration $t_D$. The recovery amplitude $I_R$ and duration $t_R$ are sufficient to recover the desired carrier density distribution distorted by gain compression effects prior to recovery. For example, and not by way of limitation, it is contemplated that gain compression effects may arise as a result of spectral hole burning and spatial hole burning in the laser cavity. The resulting drive current comprising the drive portion and the wavelength recovery portion is used to operate the laser. Due to the recovery of the carrier density distribution, some of the adverse phenomena such as large wavelength drift, abnormal wavelength mode hops, and hysteresis are eliminated.

BRIEF DESCRIPTION OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
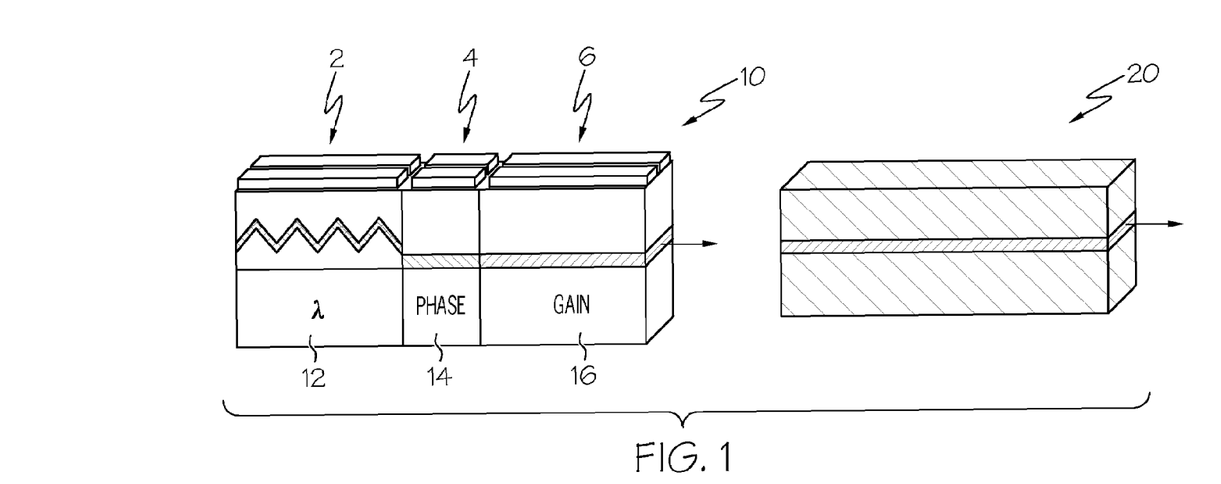
FIG. 1 is a schematic illustration of a DBR or similar type semiconductor laser optically coupled to a light wavelength conversion device.

Although the specific structure of the various types of semiconductor lasers in which the concepts of the present invention can be incorporated is taught in readily available technical literature relating to the design and fabrication of semiconductor lasers, the concepts of the present invention may be conveniently illustrated with general reference to a three-section DBR-type semiconductor laser 10 illustrated schematically in FIG. 1. In FIG. 1, the DBR laser 10 is optically coupled to light wavelength conversion device 20.

The light beam emitted by the semiconductor laser 10 can be either directly coupled into the waveguide of the wavelength conversion device 20 or can be coupled through collimating and focusing optics or some other type of suitable optical element or optical system. The wavelength conversion device 20 converts the incident light into higher harmonic waves and outputs the converted signal. This type of configuration is particularly useful in generating shorter wavelength laser beams from longer wavelength semiconductor lasers and can be used, for example, as a visible laser source for laser projection systems.

The DBR laser 10 illustrated schematically in FIG. 1 comprises a wavelength selective section 12, a phase matching section 14, and a gain section 16. The wavelength selective section 12, which can also be referred to as the DBR section of the laser 10, typically comprises a first order or second order Bragg grating positioned outside the active region of the laser cavity. This section provides wavelength selection, as the grating acts as a mirror whose reflection coefficient depends on the wavelength. The gain section 16 of the DBR laser 10 provides the major optical gain of the laser and the phase matching section 14 creates an adjustable phase shift between the gain material of the gain section 16 and the reflective material of the wavelength selective section 12. The wavelength selective section 12 may be provided in a number of suitable alternative configurations that may or may not employ a Bragg grating.

Respective control electrodes 2, 4, 6, are incorporated in the wavelength selective section 12, the phase matching section 14, the gain section 16, or combinations thereof, and are merely illustrated schematically in FIG. 1. It is contemplated that the electrodes 2, 4, 6 may take a variety of forms and typically cooperate with a corresponding conductively doped semiconductor region defined in the laser substrate. For example, the control electrodes 2, 4, 6 are illustrated in FIG. 1 as respective electrode pairs but it is contemplated that single electrode elements 2, 4, 6 in one or more of the sections 12, 14, 16 will also be suitable for practicing the present invention.

The wavelength conversion efficiency of the wavelength conversion device 20 illustrated in FIG. 1 is dependent on the wavelength matching between the semiconductor laser 10 and the wavelength conversion device 20. The output power of the higher harmonic light wave generated in the wavelength conversion device 20 drops drastically when the output wavelength of the laser 10 deviates from the wavelength conversion bandwidth of the wavelength conversion device 20. For example, when a semiconductor laser is modulated to produce data, the thermal load varies constantly. The resulting change in laser temperature and lasing wavelength generates a variation of the efficiency of the SHG crystal 20. In the case of a wavelength conversion device 20 in the form of a 12 mm-long PPLN SHG device, a temperature change in the semiconductor laser 10 of about 2° C. will typically be enough to take the output wavelength of the laser 10 outside of the 0.16 nm full width half maximum (FWHM) wavelength conversion bandwidth of the wavelength conversion device 20. The present invention addresses this problem by limiting laser wavelength variations to acceptable levels.

Figure 3:
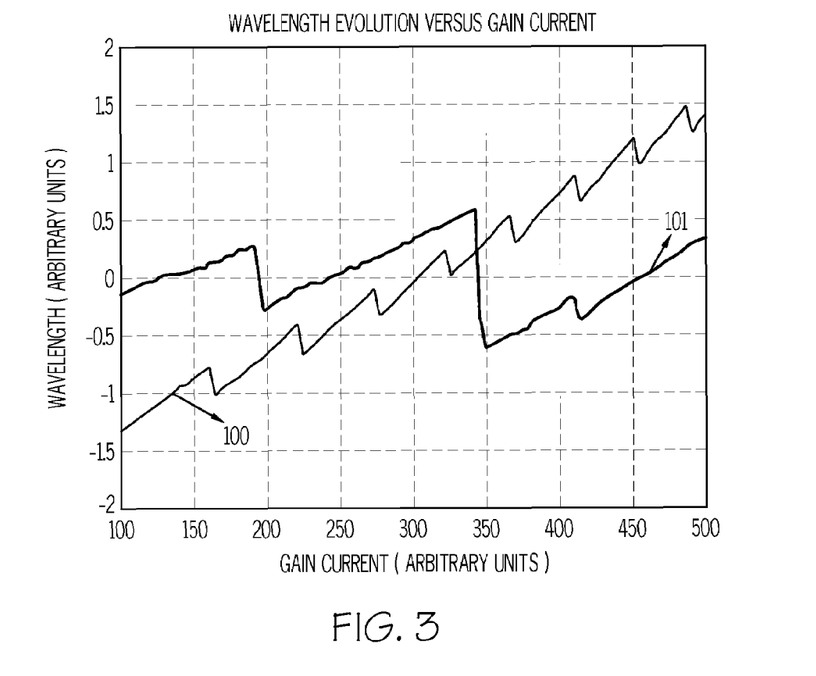
FIGS. 3 and 4 illustrate the evolution of emission wavelength as a function of gain current in a DBR laser.

The present inventors have recognized challenges in stabilizing the emission wavelength of a semiconductor laser because they are commonly subject to wavelength drift and associated cavity mode hopping. For example, and not by way of limitation, FIG. 3 illustrates the evolution of emission wavelength as a function of gain current in a DBR laser. When the gain current increases, the temperature of the gain section also increases. As a consequence, the cavity modes move towards higher wavelengths. The wavelength of the cavity modes move faster than the wavelength of the DBR section. So, the laser reaches a point where a cavity mode of lower wavelength is closer to the maximum of the DBR reflectivity curve. At that point, the mode of lower wavelength has lower loss than the mode that is established and, according to basic principles of laser physics, the laser then automatically jumps to the mode that has lower loss. This behavior is illustrated on the curve 100 of FIG. 3. As is illustrated in FIG. 3, the wavelength slowly increases and includes sudden mode hops whose amplitude is equal to one free spectral range of the laser cavity. These single mode hops are not necessarily a serious problem. Indeed, in the case of frequency doubling PPLN applications, for instance, the amplitude of those mode hops are smaller than the spectral bandwidth of the PPLN. So, the image noise associated with those small mode hops remains within acceptable amplitudes.

Referring further to FIG. 3, curve 101 illustrates significantly different emission behavior in a DBR laser. Specifically, a laser having the same general manufacturing parameters as the laser illustrated with reference to curve 100, may exhibit significantly different behavior in the sense that, instead of having mode hops with an amplitude of one laser free spectral range, the laser will exhibit mode hops having up to 6 or more free spectral range amplitudes. For many applications, this large sudden wavelength variation would not be acceptable. For example, in the case of a laser projection system, these large hops would cause sudden intensity jumps in the image from a nominal grey-scale value to a value close to zero. The present inventors have investigated this phenomena, as well as wavelength instability and hysteresis in lasers, and note that these laser emission defects can be attributed to one or more of a variety of factors, including spatial hole burning, spectral hole burning, gain profile broadening, and self induced Bragg gratings. It is contemplated that these factors may lock lasing on the particular cavity mode that has been established in the laser cavity or encourage larger mode hops. Indeed, it appears that once a mode is established, the photons that are inside the cavity at a specific wavelength disturb the laser itself by depleting the carrier density at a specific energy level or by creating a self induced Bragg grating in the cavity.

Figure 4:
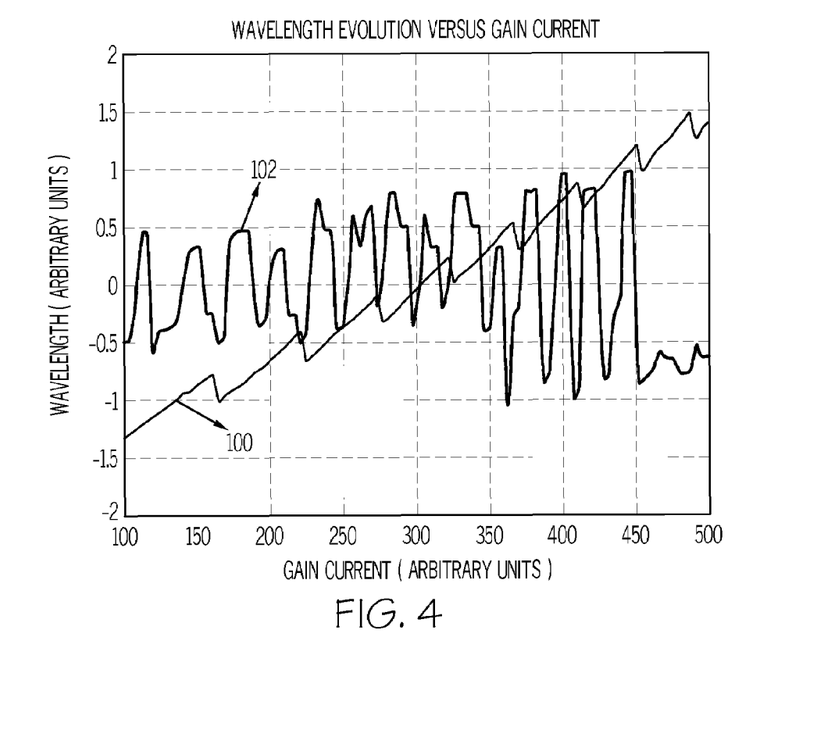

The curve 102 of FIG. 4 illustrates another case of special mode hopping behavior. In the illustrated case, the emission wavelength is unstable because it includes back reflections attributable to a component located outside the laser, a phenomena referred to as the external cavity effect. With the external cavity effect, an external reflection creates a parasitic Fabry-Perot cavity that disturbs the laser cavity and is capable of generating mode hops of very large amplitude. Regardless of the source of unacceptable wavelength drift in a semiconductor laser, the present invention is directed at minimizing wavelength fluctuations and narrowing the time-average laser oscillation optical bandwidth of the laser.

The present inventors have recognized that the large wavelength fluctuations and associated mode-hopping effect illustrated in FIGS. 3 and 4 is at least partially dependent upon photon density in the laser cavity and can be amplified when having significant external cavity effects. The present inventors have also recognized that the lasing wavelength may jump more than one mode and that this multi-mode jump may be attributable, in whole or in part, to spectral and spatial hole burning and additional lasing phenomena such as external cavity effects.

Regardless of the cause of multi-mode drift in semiconductor lasers, when this phenomenon occurs, the lasing wavelength usually shows abnormal wavelength jumps which are equal to a multiple of the cavity mode spacing. Before a large mode hop occurs, the laser usually shows large continuous wavelength shift. The larger wavelength drift and the abnormal wavelength jump can cause unacceptable noise in a laser signal. For example, if this phenomenon happens systematically in a laser projection system, an example of which is illustrated schematically in FIG. 2, the noise in the projected image will be readily visible to the human eye.

Figure 5:
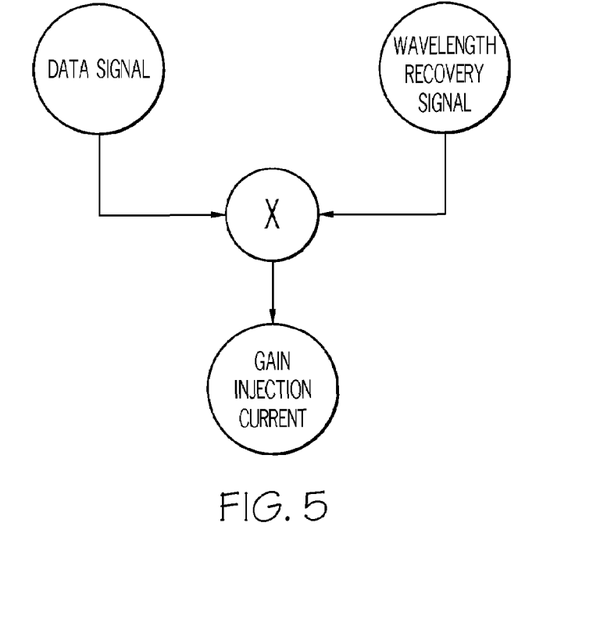
FIG. 5 illustrates a scheme for controlling laser wavelength according to one embodiment of the present invention.
Figure 6:
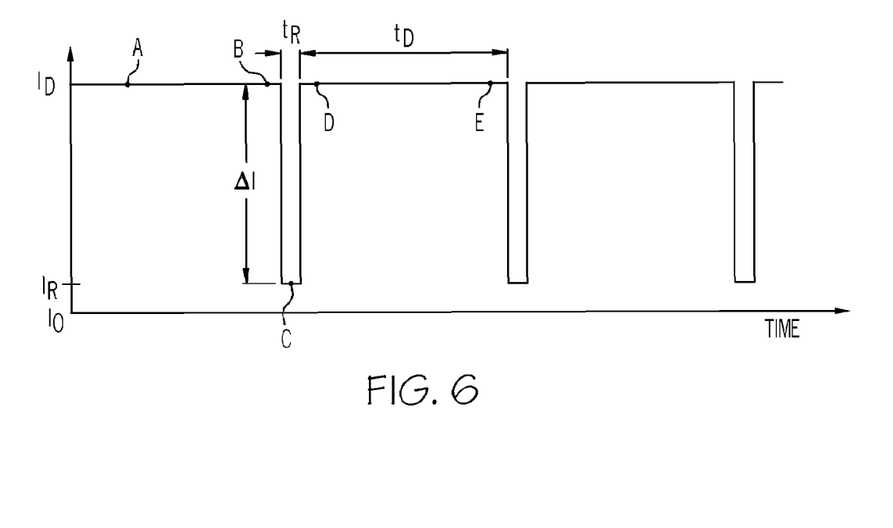
FIG. 6 is a further illustration of the control scheme illustrated in FIG. 5.

As is noted above, the present invention generally relates to control schemes where a semiconductor laser drive current comprises a drive portion and a wavelength recovery portion. FIGS. 5 and 6 illustrate a scheme for controlling wavelength in a single mode laser signal where the drive portion comprises a data portion that is injected as electrical current into the gain section of the semiconductor laser. Accordingly, in the illustrated embodiment, the drive current comprises a data portion and a wavelength recovery portion. Referring specifically to FIG. 5, theses portions of the drive current or gain injection current can be introduced by taking the product of a laser data signal and a suitably configured wavelength recovery signal. For example, and not by way of limitation, the laser data signal may carry image data for projection in a laser projection system. As is illustrated in FIG. 6, the wavelength recovery signal is configured such that the data portion of the gain section drive current, i.e., the gain injection current, comprises a relatively high drive amplitude $I_D$ of relatively long drive duration $t_D$, while the wavelength recovery portion of the drive current comprises a relatively low recovery amplitude $I_R$ of relatively short recovery duration $t_R$. The relatively high drive amplitude $I_D$ of the data portion is sufficient for lasing within the laser cavity at a lasing mode $\lambda_0$. The relatively low recovery amplitude $I_R$ of the wavelength recovery portion of the drive current is distinct from the drive amplitude $I_D$ and is illustrated in FIG. 6 as being $\Delta I$ lower than the drive amplitude $I_D$.

The drive amplitude $I_D$ and duration $t_D$ of the data portion of the gain section drive current act to produce the optical signal with appropriate power and wavelength, depending of course on the specific application in which it is to be used. The recovery amplitude $I_R$ and the recovery duration $t_R$ are sufficient to decrease photon density within at least a portion of the laser cavity. By decreasing the photon density to a lower value, in many cases close to zero, the various phenomena that cause large wavelength drift, such as spectral hole burning, spatial hole burning, gain profile broadening, or self induced Bragg gratings, disappear. As a consequence, when significant current is re-injected into the gain section at the end of the recovery period, the laser automatically selects the modes that are among the closest to the maximum of the DBR reflectivity curve. Therefore, the wavelength fluctuations can be limited to one laser free spectral range and the multi-cavity mode hops are eliminated, or at least significantly reduced. The resulting gain section drive current, which comprises the data portion and the wavelength recovery portion can be used to minimize wavelength drift and narrow the time-average laser oscillation optical bandwidth of the laser.

Stated differently, the drive amplitude $I_D$ and duration $t_D$ of the data portion of the gain section drive current increase the probability that the lasing wavelength will undergo an unacceptable drift, for example, and not by way of limitation, a change in wavelength that exceeds 0.05 nm. The relatively low recovery amplitude $I_R$ of the density recovery portion of the gain section drive current follows the data portion of the drive current and decreases the probability of an unacceptable wavelength drift. If the recovery portion of the drive current has a sufficient high frequency of occurrence, a lasing cavity mode is shut off before it has accumulated large wavelength drift and a new cavity mode is selected, therefore reducing the large wavelength drift.

In the context of a laser projection system including, for example, a frequency doubled PPLN green laser, without wavelength control according to the present invention, the green power emitted by the laser over a single line of the image display will exhibit sudden variations in power due to multiple cavity mode hops. As a result, projected images will have abrupt drops in power with amplitude on the order of 50% and more. However, employing wavelength control schemes according to the present invention where the drive signal is altered for every pixel, e.g., typically every 40 ns, it is contemplated that the undesired decrease in laser power will be highly mitigated. For example, in one execution of the present invention, residual noise standard deviation in the image was on the order of 8% with the recovery amplitude $I_R$ set to near zero, the recovery duration $t_R$ at about 10 nsec, and the drive duration $t_D$ at about 40 nsec. The image was also observed to have defects with relatively high spatial frequency, which are typically not readily apparent to the naked eye.

Although the recovery amplitude $I_R$ may be zero, it can be any value that is sufficient to eliminate the source of multiple cavity mode hops or otherwise improve the wavelength behavior of the laser. The recovery amplitude $I_R$ of the gain section drive current will be lower than the drive amplitude $I_D$ and can be substantially above zero. The relatively high drive amplitude $I_D$ may be substantially continuous but will often vary in intensity, particularly where the semiconductor laser is incorporated in an image projection system, as is described in further detail below.

Where the laser is configured for optical emission of encoded data, a data signal representing the encoded data is applied to the laser. For example, and not by way of limitation, the data signal may incorporated as an intensity or pulse-width modulated data portion of a drive signal injected into the gain section of the laser. The wavelength recovery operation of the present invention is executed to be at least partially independent of the data encoded in the data signal. For example, where the drive current is injected into the gain section of the laser, its drive portion may be intensity modulated to encode data. The wavelength recovery portion of the drive current is superimposed on the drive current, independent of the encoded data. Similarly, where the drive portion is pulse-width modulated to encode data, the wavelength recovery portion of the drive current will also be superimposed on the drive current.

The aforementioned superposition may be completely independent of the encoded data or may be applied only where the intensity of the drive current or the duration of the pulse width representing the encoded data reaches a threshold value, in which case it would be partially dependent on the encoded data. Once superimposed, however, the extent of independence of the wavelength recovery portion would need to be sufficient to ensure that sufficient wavelength recovery would be obtained. Stated differently, the wavelength recovery portion of the drive current should dominate the drive current under conditions where the data signal would otherwise prevent wavelength recovery. For example, in the context of a pulse-width modulated data signal, it is contemplated that wavelength recovery may not be needed for relatively short, high amplitude pulse-widths. However, where the encoded data includes relatively long, high amplitude pulse widths, the duty cycle defined by the drive operation and wavelength recovery operation should be sufficient to limit the maximum duration of the high amplitude pulse width to ensure that wavelength recovery can be achieved before unacceptable wavelength drift is observed. For example, it may be preferable to ensure that the maximum duration of the pulse width cannot exceed about 90% of the duration of the duty cycle defined by the drive operation and wavelength recovery operation. In addition, in the context of pulse-width modulated data, care should also be taken to ensure that the recovery amplitude $I_R$ of the wavelength recovery portion is below the threshold lasing current of the semiconductor laser or sufficiently low to recover the wavelength.

It is also noted that the wavelength recovery signal does not need to be implemented on a regular, periodic basis. Rather, the recovery signal can be applied as-needed. For example, if a wavelength drift exceeding an acceptable value is detected, e.g., more than one cavity mode spacing, a wavelength recovery operation can be implemented by superimposing a wavelength recovery signal on the drive current, forcing the laser to choose a new wavelength.

In terms of frequency of the recovery period, it generally needs to be frequent enough to limit the wavelength variation between two recovery periods to an acceptable amplitude. The ideal frequency and approach depends on the particular demands associated with the application in which the laser is utilized. As an example, for laser projection, it may be preferable to initiate recovery periods randomly or synchronize recovery periods with the image pixel generation to avoid any aliasing problem between the data content, i.e., the image, and the recovery signal. Also, by performing recovery at the highest possible frequency compatible with the electronics and laser speed any noise in the image will occur at a higher spatial frequency, making the noise harder to detect.

Figure 7:
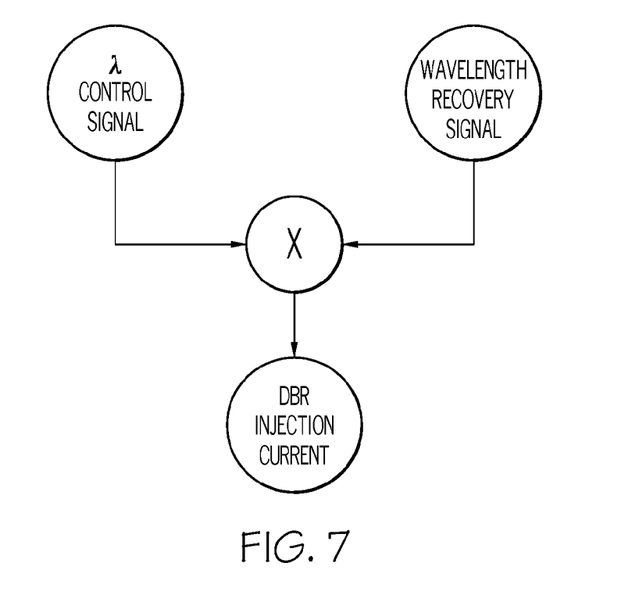
FIG. 7 illustrates a scheme for controlling laser wavelength according to another embodiment of the present invention.
Figure 8:
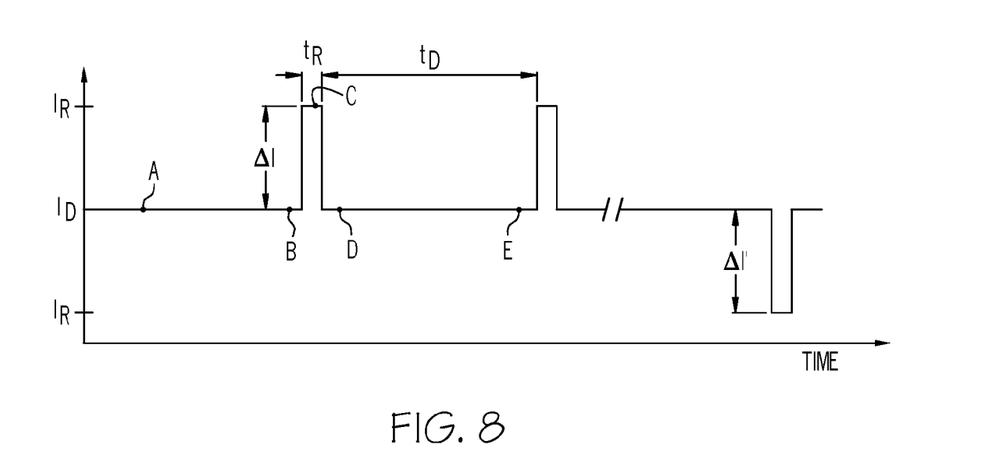
FIG. 8 is a further illustration of the control scheme of FIG. 7.

FIGS. 7 and 8 illustrate a scheme for controlling wavelength in a single mode laser signal where the aforementioned drive portion of the semiconductor laser drive current comprises a wavelength control signal injected into the wavelength selective section of the semiconductor laser. Accordingly, the drive current injected into the wavelength selective section of the semiconductor laser comprises the wavelength control portion and a wavelength recovery portion. As is noted above, this drive current is also referred to herein as the DBR injection current because the wavelength selective section of a DBR laser is commonly referred to as the DBR section of the laser.

Referring specifically to FIG. 7, the wavelength control portion and the wavelength recovery portion of the DBR injection current can be introduced by taking the product of a standard DBR wavelength control signal and a suitably configured wavelength recovery signal according to the present invention. As is illustrated in FIG. 8, the wavelength recovery signal is configured such that the wavelength control portion of the DBR injection current comprises a drive amplitude $I_D$ of relatively long drive duration $t_D$, while the wavelength recovery portion of the drive current comprises a recovery amplitude $I_R$ of relatively short recovery duration $t_R$. The recovery amplitude $I_R$ of the wavelength recovery portion of the DBR injection current is distinct from the drive amplitude $I_D$, may be lower or higher than the drive amplitude $I_D$, and is illustrated in FIG. 8 as differing from drive amplitude $I_D$ by $\Delta I$ or $\Delta I'$.

The amplitude $I_D$ of the wavelength control portion is sufficient to keep the DBR wavelength tuned to the adequate wavelength which, in the case of a frequency doubled PPLN laser is fixed by the wavelength of the doubling crystal. When the DBR current is changed to the recovery amplitude $I_R$, which is sufficiently different from the drive amplitude $I_D$, the Bragg wavelength is shifted to a different wavelength and a new cavity mode begins to lase. The original lasing cavity mode is turned off. If the new cavity mode is sufficiently displaced from the original lasing cavity mode, the phenomena that are responsible for multiple cavity mode hops will disappear, or substantially dissipate, at the laser nominal targeted wavelength. At the end of the DBR recovery pulse, the DBR current is returned to its original level, shifting the Bragg wavelength back to its original position. At this time, the new cavity mode is turned off and lasing resumes at a recovered mode at or near the original Bragg wavelength, under the recovered optical gain spectrum. It is contemplated that the resulting image will have attributes similar to those discussed above with respect to the control scheme of FIGS. 5 and 6.

One contemplated explanation of the theoretical basis for the embodiment of the present invention illustrated in FIGS. 7 and 8 is that the scheme essentially changes the photon standing wave at the gain-compressed wavelength to another wavelength outside the spectral hole burning region. The duration of the change in the standing wave is relatively brief, typically only long enough to remove the spectral hole burning and recover the original gain spectrum. It is contemplated that the wavelength shift induced under the recovery amplitude $I_R$ may vary in magnitude but will often preferably be equivalent to a wavelength shift of at least about two lasing modes. Indeed, it is contemplated that the wavelength shift may be so large as to disable lasing with the laser cavity. It is also contemplated that the control scheme of FIGS. 7 and 8 can be applied to external cavity semiconductor lasers by changing the external feedback to temporarily move the lasing wavelength out of the original position in order for the carriers to fill the spectral hole.

Figure 2:
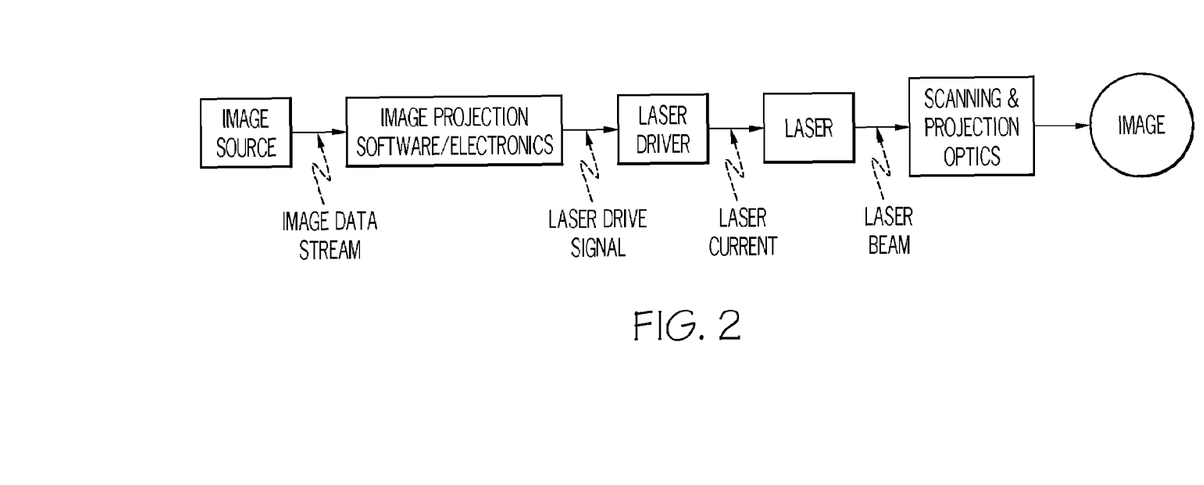
FIG. 2 is a schematic illustration of a laser projection system according to the present invention.

Referring to the laser projection system illustrated schematically in FIG. 2, it is noted that the drive current control schemes according to the present invention may be executed in a variety of forms within the system. For example, and not by way of limitation, the wavelength recovery portion of the drive current may be executed by integrating the recovery portion into the video signal during rendering by the projection software and electronics. In this approach pixels distributed throughout the image would be altered by the wavelength recovery signal independent of the required intensity from the source image. The frequency of this interruption should be chosen to minimize the impact on the human eye, and on perceived optical power. Alternatively, the wavelength recovery portion of the drive signal may be integrated into the laser driver electronics. In this approach, the drive signal, which is derived from the image stream, would be periodically overridden by the wavelength recovery signal prior to current scaling. Again, the frequency and duty cycle of this interruption should be chosen to minimize the impact on the human eye, and on perceived optical power. As a further alternative, the drive current to the laser could be periodically shunted, or otherwise reduced, to reduce or modify the drive current independent of the desired intensity level.

It is contemplated that FIGS. 5-8 illustrate laser operation schemes that may be used alternatively or together to reduce noise in a single mode laser signal. Further, the schemes of FIGS. 5-8 may be used in systems incorporating one or more single mode lasers. For example, as is described in further detail below, it is contemplated that the schemes of FIGS. 5-8 may be used alternatively or together in scanning laser image projection systems incorporating one or more single mode lasers. It is also noted that reference herein to single mode lasers or lasers configured for single mode optical emission should not be taken to restrict the scope of the present invention to lasers that operate in a single mode exclusively. Rather, the references herein to single mode lasers or lasers configured for single mode optical emission should merely be taken to imply that lasers contemplated according to the present invention will be characterized by an output spectrum where a single mode of broad or narrow bandwidth is discernable therein or by an output spectrum that is amenable to discrimination of a single mode therefrom through suitable filtering or other means.

It is contemplated that the relative magnitudes of the drive duration $t_D$ and the recovery duration $t_R$ should be controlled to preserve an optimal degree of laser efficiency while ensuring adequate wavelength recovery. For example, according to one aspect of the present invention, at least about 80% of a duty cycle of the drive signal is occupied by the drive duration $t_D$ and less than about 20% of a duty cycle of the drive signal is occupied by the recovery duration $t_R$. In many instances, it will be sufficient to ensure that the recovery duration $t_R$ is less than about 10 ns, perhaps shorter than about 5 ns. Additionally control schemes are contemplated where at least about 95% of the duty cycle of the drive signal is occupied by the drive duration $t_D$ and less than about 5% of the duty cycle is occupied by the recovery duration $t_R$. In cases where the electric circuitry controlling the drive signal is sufficiently responsive, adequate control schemes are contemplated where at least about 97.5% of the duty cycle of the drive signal is occupied by the drive duration $t_D$ and less than about 2.5% of the duty cycle is occupied by the recovery duration $t_R$.

Additional considerations need to be accounted for when establishing the respective values of the drive duration $t_D$ the recovery duration $t_R$ in the context of laser projection systems. For example, and not by way of limitation, the laser projection system illustrated in FIG. 2 comprises an image source generating a single or multi-color image data stream, image projection software and associated electronics for generating a laser drive signal for each primary image color, a laser driver generating respective laser drive currents for individual lasers configured to generate each primary image color, and scanning and projection optics that operate to generate a single or multi-color projected image comprising an array of image pixels. Each of the image pixels in this and other types of scanning laser image projecting systems is characterized by an active pixel duration $t_P$. For example, and not by way of limitation, the active pixel duration of a pixel in the image may be 40 nsec or less. Generally, the recovery duration $t_R$ will be less than the pixel duration $t_P$. Preferably, the recovery duration $t_R$ is at least 50% less than the pixel duration $t_P$. In contrast, the drive duration $t_D$ may be greater than, less than, or equal to the pixel duration $t_P$, depending upon the preferences of the system designer.

Those skilled in the art will recognize that the active pixel duration $t_P$ may vary modestly and periodically across the image as a result of scanning speed variations. Accordingly, reference to a projecting system that is "characterized by an active pixel duration" should not be taken to denote that each pixel in an image has the same pixel duration. Rather, it is contemplated that individual pixels within the display may have different pixel durations that each fall under the general concept of a display characterized by an active pixel duration $t_P$.

A multi-tone image can be generated by the image projection system by configuring the image projection electronics and the corresponding laser drive currents to establish a pixel intensity that varies across the array of image pixels. In this case, the wavelength recovery portion of the drive current is superimposed upon the signal that encodes the varying pixel intensity. Further detail concerning the configuration of scanning laser image projection systems and the manner in which varying pixel intensities are generated across an image is beyond the scope of the present invention and may be gleaned from a variety of readily available teachings on the subject.

It is contemplated that other projection systems, such as spatial light modulator based systems (including digital light processing (DLP), transmissive LCD, and liquid crystal on silicon (LCOS)), incorporating laser-based light sources may benefit from the wavelength stabilization techniques described herein. In these other systems the relevant period exogenous to the laser is not the pixel period but the inverse of the screen refresh rate, or a fraction thereof. In these cases the input signal to the laser will be characterized by an encoded data period $t_P$ and the drive current will be configured such that the recovery duration $t_R$ of the wavelength recovery portion is less than said encoded data period $t_P$.

Reference is made throughout the present application to various types of currents. For the purposes of describing and defining the present invention, it is noted that such currents refer to electrical currents. Further, for the purposes of defining and describing the present invention, it is noted that reference herein to "control" of an electrical current does not necessarily imply that the current is actively controlled or controlled as a function of any reference value. Rather, it is contemplated that an electrical current could be controlled by merely establishing the magnitude of the current.

It is to be understood that the preceding detailed description of the invention is intended to provide an overview or framework for understanding the nature and character of the invention as it is claimed. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

For example, although the control schemes described herein relate to the incorporation of a wavelength recovery portion in a drive current applied to a gain section or wavelength selective DBR section of a semiconductor laser, it is contemplated that methods of incorporating the wavelength recovery operation of the present invention in a laser operating scheme are not limited to drive currents applied to only these portions of a laser. For example, and not by way of limitation, the laser may include a recovery portion that is configured to absorb photons when a recovery signal is applied thereto. In which case, the recovery portion can be used to decrease photon density as needed, in a manner similar that which is employed for the gain and DBR sections described herein.

It is noted that terms like "preferably," "commonly," and "typically," when utilized herein, are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Further, it is noted that reference to a value, parameter, or variable being a "function of" another value, parameter, or variable should not be taken to mean that the value, parameter, or variable is a function of one and only one value, parameter, or variable.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation. e.g., "substantially above zero," varies from a stated reference, e.g., "zero," and should be interpreted to require that the quantitative representation varies from the stated reference by a readily discernable amount.

What is claimed is:

1. A method of controlling laser wavelength variations in a semiconductor laser, said method comprising:
configuring said laser for single mode optical emission of encoded data, at least one parameter of said optical emission being a function of a drive current injected into said semiconductor laser;
configuring said drive current to comprise a drive portion and a wavelength recovery portion, wherein said drive portion of said drive current comprises a drive amplitude $I_D$ and a drive duration $t_D$, said wavelength recovery portion of said drive current comprises a recovery amplitude $I_R$ and a recovery duration $t_R$, said recovery amplitude $I_R$ is sufficiently low to decrease photon density in the semiconductor laser and is distinct from said drive amplitude $I_D$, said recovery duration $t_R$ is less than said drive duration $t_D$, and said recovery amplitude $I_R$ and said recovery duration $t_R$ are at least partially independent of said encoded data; and
utilizing said drive current comprising said drive portion and said wavelength recovery portion to operate said laser.

2. A method as claimed in claim 1 wherein said recovery amplitude $I_R$ and said recovery duration $t_R$ are selected such that wavelength fluctuations of said semiconductor laser are narrowed as a result of said wavelength recovery portion of said drive current.

3. A method as claimed in claim 1 wherein:
said drive amplitude $I_D$ is sufficient for lasing at a lasing mode $\lambda_0$;
said drive amplitude $I_D$ and duration $t_D$ are sufficient to increase the probability that said lasing mode $\lambda_0$ will undergo a substantial wavelength change; and
said recovery amplitude $I_R$ and said recovery duration $t_R$ are sufficient to decrease the probability of said substantial wavelength change.

4. A method as claimed in claim 1 wherein:
said drive current is injected into a gain section of said semiconductor laser; and
said drive portion of said drive current comprises an intensity modulated or pulse width modulated data portion.

5. A method as claimed in claim 4 wherein said data portion and said wavelength recovery portion of said gain section drive current comprise, relative to each other, a relatively high drive amplitude $I_D$ of relatively long drive duration $t_D$ and a relatively low recovery amplitude $I_R$ of relatively short recovery duration $t_R$.

6. A method as claimed in claim 5 wherein said gain section drive current is configured such that said relatively low recovery amplitude $I_R$ is substantially above zero.

7. A method as claimed in claim 5 wherein said gain section drive current is configured such that said relatively low recovery amplitude $I_R$ is closer to a threshold lasing current of said laser than to zero.

8. A method as claimed in claim 5 wherein said relatively high drive amplitude $I_D$ varies in intensity.

9. A method as claimed in claim 1 wherein:
said drive current is injected into a wavelength selective section of said semiconductor laser; and
said drive portion of said drive current comprises a wavelength control portion.

10. A method as claimed in claim 9 wherein:
said wavelength control portion of said drive current comprises a drive amplitude $I_D$ of relatively long drive duration $t_D$; and
said wavelength recovery portion of said wavelength selective section drive current comprises a recovery amplitude $I_R$ of relatively short recovery duration $t_R$.

11. A method as claimed in claim 10 wherein said recovery amplitude $I_R$ is sufficiently different from said drive amplitude $I_D$ to change the wavelength of said lasing mode $\lambda_0$ over at least a portion of said recovery duration $t_R$.

12. A method as claimed in claim 11 wherein said change in the wavelength of said lasing mode $\lambda_0$ is equivalent to a wavelength shift of at least about two lasing modes defined within said laser.

13. A method as claimed in claim 10 wherein said recovery amplitude $I_R$ is sufficiently different from said drive amplitude $I_D$ to disable lasing within said laser.

14. A method as claimed in claim 1 wherein at least about 80% of a duty cycle of said drive signal is occupied by said drive duration $t_D$ and less than about 20% of a duty cycle of said drive signal is occupied by said recovery duration $t_R$.

15. A method as claimed in claim 14 wherein said recovery duration $t_R$ is less than about 10 ns.

16. A method as claimed in claim 14 wherein said recovery duration $t_R$ is less than about 5 ns.

17. A method as claimed in claim 1 wherein at least about 95% of a duty cycle of said drive signal is occupied by said drive duration $t_D$ and less than about 5% of a duty cycle of said drive signal is occupied by said recovery duration $t_R$.

18. A method as claimed in claim 1 wherein at least about 97.5% of a duty cycle of said drive signal is occupied by said drive duration $t_D$ and less than about 2.5% of a duty cycle of said drive signal is occupied by said recovery duration $t_R$.

19. A method as claimed in claim 1 wherein:
said laser is configured for pulse width modulation of a data signal applied to a gain section of said laser;
a maximum duration of said pulse width is limited by a duty cycle defined by said drive duration $t_D$ and said recovery duration $t_R$.

20. A method as claimed in claim 19 wherein said maximum duration of said pulse width is not greater than about 90% of a duration of said duty cycle.

21. A method as claimed in claim 19 wherein:
said pulse width modulated data signal applied to said gain section of said laser comprises said wavelength recovery portion of said gain section drive current; and
said recovery amplitude $I_R$ of said wavelength recovery portion is below a threshold lasing current of said semiconductor laser.

22. A method as claimed in claim 1 wherein the wavelength recovery portion comprises a plurality of wavelength recovery periods and the wavelength recovery periods are initiated randomly.

23. A method of controlling laser wavelength variations in a semiconductor laser comprised within a laser projection system, said method comprising:
configuring said laser for single mode optical emission of encoded data, at least one parameter of said optical emission being a function of a drive current injected into said semiconductor laser;
configuring said drive current to comprise a drive portion and a wavelength recovery portion, wherein said drive portion of said drive current comprises a drive amplitude $I_D$ and a drive duration $t_D$, said wavelength recovery portion of said drive current comprises a recovery amplitude $I_R$ and a recovery duration $t_R$, said recovery amplitude $I_R$ is distinct from said drive amplitude $I_D$, said recovery duration $t_R$ is less than said drive duration $t_D$, and said recovery amplitude $I_R$ and said recovery duration $t_R$ are at least partially independent of said encoded data;

utilizing said drive current comprising said drive portion and said wavelength recovery portion to operate said laser;

generating a laser image utilizing an output beam of said semiconductor laser, wherein said output beam is modulated with an image signal characterized by an encoded data period $t_P$;

configuring said drive current such that said wavelength recovery portion is incorporated in said drive current at least partially independent of data representing said scanned laser image and such that said recovery duration $t_R$ is less than said encoded data period $t_P$.

24. A method of controlling laser wavelength variations in a semiconductor laser comprised within a laser projection system, said method comprising:

configuring said laser for single mode optical emission of encoded data, at least one parameter of said optical emission being a function of a drive current injected into said semiconductor laser;

configuring said drive current to comprise a drive portion and a wavelength recovery portion, wherein said drive portion of said drive current comprises a drive amplitude $I_D$ and a drive duration $t_D$, said wavelength recovery portion of said drive current comprises a recovery amplitude $I_R$ and a recovery duration $t_R$, said recovery amplitude $I_R$ is distinct from said drive amplitude $I_D$, said recovery duration $t_R$ is less than said drive duration $t_D$, and said recovery amplitude $I_R$ and said recovery duration $t_R$ are at least partially independent of said encoded data;

utilizing said drive current comprising said drive portion and said wavelength recovery portion to operate said laser;

generating a scanned laser image by scanning an output beam of said semiconductor laser across said image, wherein said scanned laser image comprises an array of image pixels, each of said image pixels being characterized by an active pixel duration $t_P$;

configuring said drive current such that said wavelength recovery portion is incorporated in said drive current at least partially independent of data representing said scanned laser image and such that said recovery duration $t_R$ is less than said pixel duration $t_P$.

25. A method as claimed in claim 24 wherein said recovery duration $t_R$ is less than 50% of said pixel duration $t_P$.

26. A method as claimed in claim 24 wherein:

said image projection electronics is configured such that said drive current establishes a varying pixel intensity across said array of image pixels; and said wavelength recovery portion of said drive current is superimposed upon said varying pixel intensity.

27. A method of controlling laser wavelength variations in a semiconductor laser comprised within a laser projection system, said method comprising:

configuring said laser for single mode optical emission of encoded data, at least one parameter of said optical emission being a function of a drive current injected into said semiconductor laser;

configuring said drive current to comprise a drive portion and a wavelength recovery portion, wherein said drive portion of said drive current comprises a drive amplitude $I_D$ and a drive duration $t_D$, said wavelength recovery portion of said drive current comprises a recovery amplitude $I_R$ and a recovery duration $t_R$, said recovery amplitude $I_R$ is distinct from said drive amplitude $I_D$, said recovery duration $t_R$ is less than said drive duration $t_D$, and said recovery amplitude $I_R$ and said recovery duration $t_R$ are at least partially independent of said encoded data; and utilizing said drive current comprising said drive portion and said wavelength recovery portion to operate said laser, wherein said laser projection system comprises at least one additional semiconductor laser configured for lasing at respective lasing wavelengths distinct from the wavelength of said lasing mode $\lambda_0$;

said laser projection system further comprises image projection electronics and laser scanning and projection optics operative to generate a projected image comprising an array of image pixels; and said method further comprises operating said semiconductor laser and said additional lasers such that at least one of said image pixels is illuminated thereby.

28. A method of controlling laser wavelength variations in a semiconductor laser, said method comprising:

configuring said laser for single mode optical emission of encoded data, at least one parameter of said optical emission being a function of a drive current injected into said semiconductor laser;

configuring said drive current to comprise a drive portion and a wavelength recovery portion, wherein said drive portion of said drive current comprises a relatively high drive amplitude $I_D$ and a drive duration $t_D$, said wavelength recovery portion of said drive current comprises a relatively low recovery amplitude $I_R$ and a recovery duration $t_R$, said recovery amplitude $I_R$ is distinct from said drive amplitude $I_D$, said recovery duration $t_R$ is less than said drive duration $t_D$, and said recovery amplitude $I_R$ and said recovery duration $t_R$ are at least partially independent of said encoded data; and utilizing said drive current comprising said drive portion and said wavelength recovery portion to operate said laser wherein said relatively high drive amplitude $I_D$ is above a threshold lasing current of said laser and said relatively low recovery amplitude $I_R$ is below said threshold lasing current of said laser.

29. A laser controller programmed to operate a semiconductor laser wherein:

said laser controller comprises a laser drive current output;

said laser controller is programmed to generate a laser drive current at said drive current output;

said laser drive current is suitable to control at least one parameter of a laser comprising a laser cavity configured for single mode optical emission at least partially in response to said drive current;

said laser drive current comprises a drive portion and a wavelength recovery portion;

said drive portion of said laser drive current comprises a drive amplitude $I_D$;

said wavelength recovery portion of said drive current comprises a recovery amplitude $I_R$ distinct from said drive amplitude $I_D$ and a recovery duration $t_R$ less than a drive duration $t_D$ wherein said recovery amplitude $I_R$ is below a threshold lasing current of said laser cavity or is sufficiently low to decrease photon density in the laser cavity.

30. A laser system comprising at least one semiconductor laser and a laser controller programmed to operate said semiconductor laser wherein:

said laser controller comprises a laser drive current output coupled to said semiconductor laser;

said laser controller is programmed to generate a laser drive current at said drive current output;

said laser drive current is suitable to control at least one parameter of a laser comprising a laser cavity configured for single mode optical emission upon injection of said drive current into said semiconductor laser;

said laser drive current comprises a drive portion and a wavelength recovery portion;

said drive portion of said laser drive current comprises a drive amplitude $I_D$; and said wavelength recovery portion of said drive current comprises a recovery amplitude $I_R$ distinct from said drive amplitude $I_D$ and a recovery duration $t_R$ less than a drive duration $t_D$ wherein said recovery amplitude $I_R$ is below a threshold lasing current of said laser cavity or is sufficiently low to decrease photon density in the laser cavity.

* * * * *